United States Patent [19]

Ohtani

[11] Patent Number: 5,163,322
[45] Date of Patent: Nov. 17, 1992

[54] THERMAL FLOW SENSOR

[75] Inventor: Hichiro Ohtani, Himeji, Japan

[73] Assignee: Mitsubishi Denki Kabushiki Kaisha, Tokyo, Japan

[21] Appl. No.: 627,452

[22] Filed: Dec. 14, 1990

[30] Foreign Application Priority Data

Dec. 18, 1989 [JP] Japan .................... 1-146141[U]

[51] Int. Cl.$^5$ .................................... G01F 1/68
[52] U.S. Cl. .................................... 73/204.21
[58] Field of Search ............ 73/198, 204.21, 204.25, 73/204.27

[56] References Cited

U.S. PATENT DOCUMENTS 3,687,130 8/1972 McCormack ............ 73/204.27
4,280,360 7/1981 Kobayashi et al. ............ 73/198
4,326,412 4/1982 Kobayashi et al. ............ 73/204.27

OTHER PUBLICATIONS

Japanese Abstract 1-32120 Feb. 1989 and 1-66518 Mar. 1989.

Primary Examiner—Herbert Goldstein
Attorney, Agent, or Firm—Sughrue, Mion, Zinn, Macpeak & Seas

[57] ABSTRACT

A thermal flow sensor is constructed in such a manner that the longitudinal axis of a thermal resistance element is positioned so as to face wires of a rectification net at an angle ranging from 10° to 80°. The surface of the thermal resistance element onto which the openings between the wires of the rectification net would be projected remains substantially the same, regardless of changes in attachment positions of the thermal resistance and the rectification net. Even when the thermal resistance element is arranged close to the rectification net, unevenness in characteristics between the components can be reduced.

2 Claims, 2 Drawing Sheets

ANGLE ($\theta$) AT WHICH RECTIFICATION NET 2 IS ATTACHED WITH RESPECT TO LONGITUDINAL AXIS OF THERMAL RESISTANCE ELEMENT 3

THERMAL FLOW SENSOR

BACKGROUND OF THE INVENTION

1. FIELD OF THE INVENTION

The present invention relates to a thermal flow sensor which measures the flow rate of fluid by using a thermal resistance element.

2. DESCRIPTION OF THE RELATED ART

A thermal flow sensor is disclosed, for example, in Japanese Utility Mode Laid-Open No. 61-108930. This thermal flow sensor is constructed in such a manner that a thermal resistance element is disposed in a fluid passage, and the flow rate of the fluid is measured according to the temperature conditions of the thermal resistance element.

FIG. 3 is a view showing the structure of such a flow sensor. In FIG. 3, a rectification net 2 is positioned on the upstream side of a cylindrical conduit 1 which guides a fluid to be measured, this rectification net 2 being used for rectifying the flow of the fluid to be measured flowing inside the cylindrical conduit 1. As shown in FIG. 4, the rectification net 2 is made by combining wires 2a into a lattice-like structure. A thermal resistance element 3 which is cooled by the fluid is disposed on the downstream side of the rectification net 2. The thermal resistance element 3 is fed with control electric power from an electronic circuit 4. This electronic circuit 4 is composed of resistors 5, 6, 7, a differential amplifier 8, a transistor 9, and a power supply 10. The resistors 5, 6, 7 form a Wheatstone bridge circuit together with the thermal resistance element 3. The differential amplifier 8 is connected to the middle point of the Wheatstone bridge. The conductivity of the transistor 9 is controlled by the differential amplifier 8. The power supply 10 feeds the Wheatstone bridge circuit with operational electric power through the transistor 9.

With the above structure, the values of the resistors 5, 6, 7 are so set or chosen that the thermal resistance element 3 reaches a predetermined temperature. When a fluid is fed into the conduit 1, the resistance element 3 is cooled as the fluid flows. The degree of this cooling is directly proportional to the flow rate of the fluid. On the other hand, since the resistance values of the thermal resistance element 3 vary, it is possible to measure output in accordance with the flow rate at a node "A" where the thermal resistance element 3 is connected to the resistor 6. This measurement is made possible by controlling the transistor 9 through the differential amplifier 8. It is thus possible to calculate the mass flow rate of the fluid.

Furthermore, in the above situation when the flow of a fluid acting on the thermal resistance element 3 is disturbed, it is difficult to accurately measure the flow rate of the fluid. The fluid can be stabilized by placing the rectification net 2 upstream from the thermal resistance element 3.

Now, in such a thermal flow sensor, when the rectification net 2 is positioned close to the thermal resistance element 3, the flow velocity of a fluid is unevenly distributed. In other words, the fluid flows slowly downstream of the wires 2a which make up the rectification net 2, whereas the fluid flows fast at the openings of the wires 2a. As expressed in the following equation, it is known that the quantity of heat "Q" which is absorbed by the fluid from the surface of the thermal resistance element 3 is directly proportional to the surface area of the thermal resistance element 3 exposed to the fluid:

$$Q = \alpha (t_0 - t_1) S.$$

where $\alpha$ is the heat transfer rate of the entire thermal resistance element 3;

$t_0$ is the surface temperature of the thermal resistance element 3;

$t_1$ is the temperature of the fluid; and

S is the surface area of the thermal resistance element 3.

Thus, as shown in FIGS. 4 and 5, the area of the thermal resistance element 3 facing the openings between the wires 2a varies according to the placement of the thermal resistance element 3 and the rectification net 2. This fact indicates that the effective surface area "S" of the thermal resistance element 3 varies. As a result, the output characteristics of the thermal flow sensor also vary according to the attachment relationships between the rectification net 2 and the thermal resistance element 3.

Thus, in the conventional thermal flow sensor, the thermal resistance element 3 must be placed farther away than a fixed distance (L) where the problem of uneven flow is solved. This fact is an obstacle to the miniaturization of the thermal flow sensor.

For the thermal resistance elements 3 as shown in FIGS. 6 and 7, it is confirmed from experiments that the fixed distance (L) must be at least 20 times the width (W) or diameter (d) of the thermal resistance elements 3. In this embodiment, the sizes of the thermal resistance element 3 are as follows:

length (l) $\geq$ width (W) $\geq$ thickness (t), or length (l) $\geq$ diameter (d)

SUMMARY OF THE INVENTION

The present invention has been developed to solve the above problem. Accordingly, an object of this invention is to provide a thermal flow sensor which can be miniaturized, and which can repress variations in characteristics between the components.

In order to achieve the above object, there is provided a thermal flow sensor comprising: a conduit for guiding fluid to be measured; a thermal resistance element arranged inside the conduit; an electronic circuit for feeding control electric power to the thermal resistance element; and a rectification net for rectifying flow of the fluid. The rectification net is provided for the conduit on the upstream side of the thermal resistance element, and the thermal resistance element and the rectification net are arranged so as to face each other at a distance within 20 times the width or the diameter of the thermal resistance element. The thermal resistance element and the rectification net are so attached that a relative angle between a longitudinal axis of the thermal resistance element and wires of the rectification net forms an angle ranging from 10° to 80°.

DESCRIPTION OF THE PREFERRED EMBODIMENT

Figure 1:
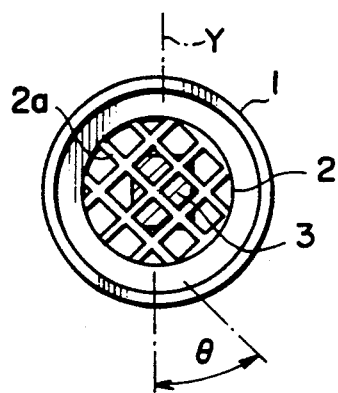
FIG. 1 is a front view showing the main components of a thermal flow sensor in accordance with an embodiment of the present invention.
Figure 2:
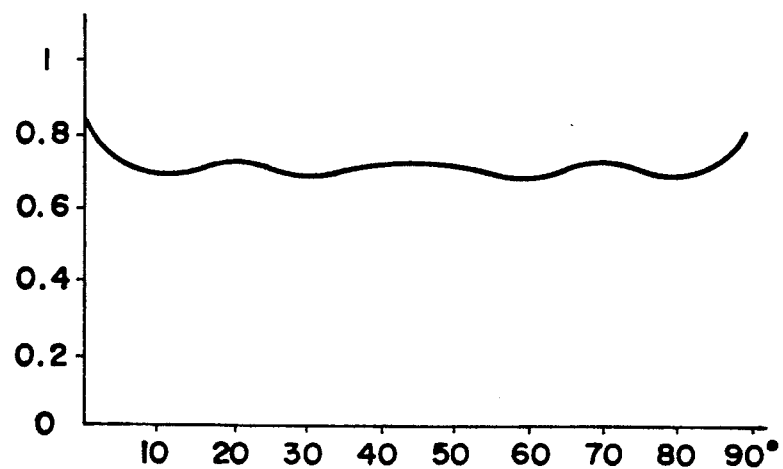
FIG. 2 is a view showing the characteristics of the thermal flow sensor illustrated in FIG. 1.
Figure 3:
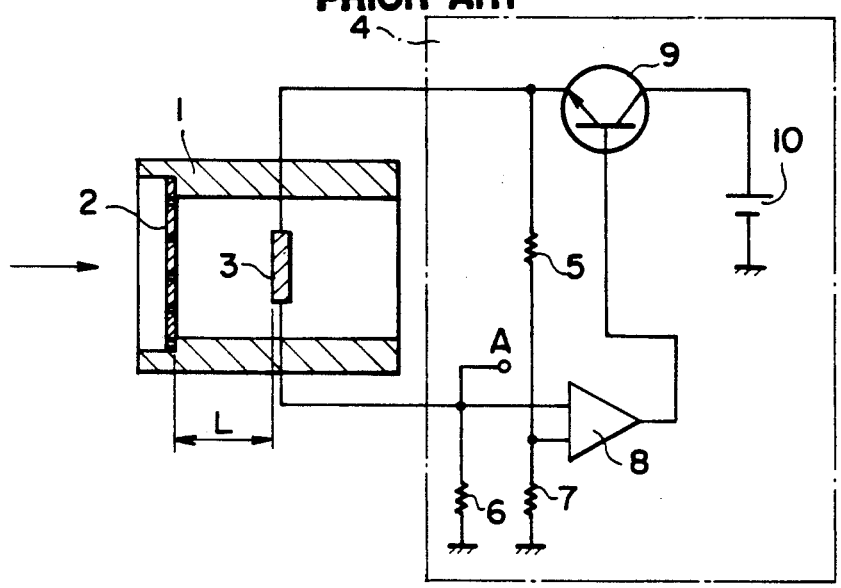
FIG. 3 is a view showing the thermal flow sensor of the present invention and of the prior art.
Figure 4:
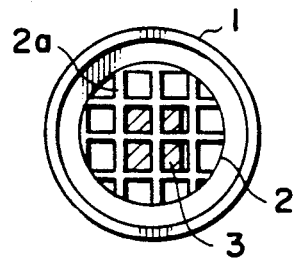
FIGS. 4 and 5 are front views showing rectification nets.
Figure 5:
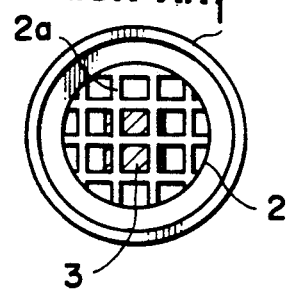
Figure 6:
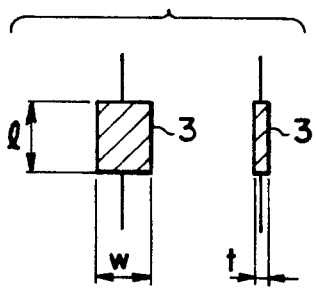
FIGS. 6 and 7 are schematic illustrations showing the structures of thermal resistance elements.
Figure 7:
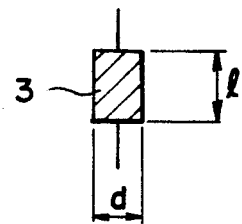

An embodiment of the present invention will be described hereinafter with reference to FIGS. 1 and 2. FIG. 1 is a front view in which a thermal flow sensor is seen from the side of a rectification net 2. When rectification net 2 and a thermal resistance element 3 are attached to a conduit 1, wires 2a, which form the rectification net 2, are positioned facing the thermal resistance element 3 so that these wires 2a are slanted at an angle $\theta$ with respect to the longitudinal axis "Y" of the thermal resistance element 3. Furthermore, the distance "L" between the rectification net 2 and the thermal resistance element 3 is set to be less than 20 times the width "W" or the diameter "d" of the thermal resistance element 3. Other components in this embodiment are substantially the same as those shown in FIG. 3.

Thus, it is possible to reduce variations in the areas which would be projected onto the thermal resistance element 3 through the openings of the wires 2a. This reduction is made by causing the longitudinal axis "Y" of the thermal resistance element 3 to face the rectification net 2 at an acute angle. In other words, as shown in FIG. 2, it has been determined that when the relative angle between the rectification net 2 and the thermal resistance element 3 is varied, the areas of the openings of the rectification 2 which would be projected onto the surface of the thermal resistance element 3 change greatly in ranges from 0° to 10° and from 80° to 90°, whereas the same areas change very little in a range from 10° to 80°.

Thus, by setting the relative angle $\theta$ between the rectification net 2 and the thermal resistance element 3 to a range from 10° to 80°, the areas of the openings of the rectification net 2, which face the thermal resistance element 3, change only slightly, regardless of changes in the attachment positions of the rectification net 2 and the thermal resistance element 3. It is thus possible to repress an uneven output distribution of the thermal flow sensor. For the above reasons, it is no longer necessary to provide an ample distance "L" between the rectification net 2 and the thermal resistance element 3.

A highly precise thermal flow sensor can thus be miniaturized.

As has been described above, it is possible to miniaturize the thermal flow sensor, and to repress characteristics variations. This is because the thermal flow sensor is readily constructed in such a manner that the rectification net and the thermal resistance element are arranged at an angle ranging from 10° to 80°.

What is claimed is:

1. A thermal flow sensor, comprising:
   a tubular conduit for guiding fluid to be measured;
   a thermal resistance element having a longitudinal axis, centrally disposed inside said conduit, and presenting a discrete surface area when viewed from an upstream direction;
   a pair of electrical wires individually connected to opposite ends of said thermal resistance element and supporting said element centrally within said conduit;
   an electronic circuit for feeding control electric power to said thermal resistance element via said electrical wires; and
   a rectification net formed by a lattice of intersecting wires for rectifying flow of said fluid, the rectification net being disposed in the conduit upstream of said thermal resistance element, said thermal resistance element and said rectification net being disposed spaced from each other by a distance less than 20 times a width or a diameter of said thermal resistance element, and said thermal resistance element and said rectification net being oriented such that a relative angle between said longitudinal axis of the thermal resistance element and wires of said rectification net forms an angle ranging from 10° to 80° such that a total area of the thermal resistance element facing upstream and exposed through openings between the intersecting lattice wires of the rectification net, and onto which said openings are projected, remains substantially constant within said range.

2. A thermal flow sensor as claimed in claim 1 wherein said electronic circuit includes a plurality of resistors which form a Wheatstone bridge circuit together with said thermal resistance element; a differential amplifier connected across a diagonal of the Wheatstone bridge circuit; a transistor whose conductivity is controlled by said differential amplifier; and a power supply for feeding said transistor with operational electric power through the Wheatstone bridge circuit.

* * * * *